United States Patent [19]

Spietschka et al.

[11] Patent Number: 4,705,572
[45] Date of Patent: Nov. 10, 1987

[54] PROCESS FOR THE PREPARATION OF PIGMENTS OF THE ANTHANTHRONE SERIES

[75] Inventors: Ernst Spietschka, Idstein; Manfred Urban, Wiesbaden, both of Fed. Rep. of Germany

[73] Assignee: Hoechst Aktiengesellschaft, Fed. Rep. of Germany

[21] Appl. No.: 872,542

[22] Filed: Jun. 9, 1986

[30] Foreign Application Priority Data

Jun. 11, 1985 [DE] Fed. Rep. of Germany ....... 3520806

[51] Int. Cl.$^4$ .......................... C08K 5/08; C09B 3/60; C09B 67/54
[52] U.S. Cl. ................................ 106/288 Q; 106/289; 106/309; 260/350 L; 260/359
[58] Field of Search .................... 106/288 Q, 289, 309; 260/359, 350 L

[56] References Cited

U.S. PATENT DOCUMENTS 2,032,458  3/1936  Adamson ............................ 106/289
3,265,699  8/1966  Jaffe ................................ 106/288 Q

FOREIGN PATENT DOCUMENTS 75182  3/1983  European Pat. Off. .
719072  11/1954  United Kingdom .
1463141  2/1977  United Kingdom .

OTHER PUBLICATIONS

E. R. Trotman, "Dyeing and Chemical Technology of Textile Fibres", S4th Edition, (Wiley-Interscience), 1984, pp. 432-433.
Fiat 1313, vol. 11/1.

Primary Examiner—A. Lionel Clingman

[57] ABSTRACT

Process for the preparation of pigments of the anthanthrone series of the formula

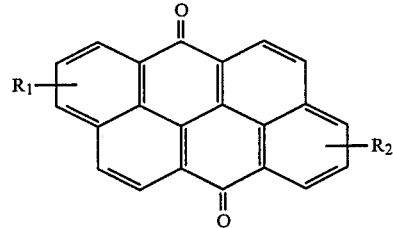

in which $R_1$ and $R_2$ denote chlorine, bromine or iodine atoms or $C_1$–$C_4$-alkoxy groups, having valuable properties, which comprises first converting the anthanthrones of the formula mentioned, in the form of the crude pigment, in an aqueous alkaline medium and at a pH > 10, into the leucoform, precipitating the latter by adding inorganic or organic acids, reoxidizing the aqueous suspension of the leuco-form to give the anthanthrones and subjecting the resulting finely divided prepigments of the formula mentioned to a solvent finish.

5 Claims, No Drawings

PROCESS FOR THE PREPARATION OF PIGMENTS OF THE ANTHANTHRONE SERIES

The invention relates to a process for the preparation of pigments of the anthanthrone series having valuable properties by an economical route, starting from the crude pigments.

Halogenated anthanthrones have acquired considerable industrial importance as vat dyestuffs in textile dyeing. 4,10-Dibromoanthanthrone has proved to be an industrially important pigment with excellent fastness properties.

The preparation of the corresponding coarsely crystalline crude pigment is described in FIAT 1313 Volume II/1. Various processes have been disclosed for its conversion into the pigment form. German Pat. No. 2,540,739 describes bringing pigments into a state of fine division by reprecipitating the crude pigments, for example dibromoanthanthrone, with concentrated sulfuric acid, this being followed by a treatment with cetyltrimethylammonium bromide. The pigments thus obtained have only a moderate tinctorial strength and an unsatisfactory rheological behavior. Unsatisfactory rheological behavior is to be understood in this context as meaning low gloss, considerable flocculation, high viscosity and low dispersion stability. In addition, the large amounts of dilute acids produced result in considerable pollution of effluent. British Pat. No. 719,072 describes bringing dibromoanthanthrone into a state of fine division by suspending it in a mixture of iron(II) chloride and ethylene chloride, followed by hydrolysis. The pigments thus obtained are relatively opaque and pale and do not meet the requirements of the market as far as their rheological behavior is concerned. Furthermore, working with ethylene chloride entails a considerable industrial outlay. European Patent No. 0,075,182 describes a process in which dibromoanthanthrone is brought into a state of fine division by treatment with phosphoric acid and subsequent hydrolysis, which could be followed by known finishing variants. The pigments prepared by this process have only a low tinctorial strength and an unsatisfactory rheological behavior. In addition, large amounts of dilute acids are produced.

U.S. Pat. No. 2,032,458 describes the oxidation of the dissolved leuco-compounds of vat dyestuffs by means of salts of nitrobenzenesulfonic acids; 4,10-dibromoanthanthrone is not mentioned however. Since, according to the claims of this process, the oxidation must be carried out using the dissolved leuco-compound-which, in the case of 4,10-dibromoanthanthrone, would mean a high dilution which could not be justified on economic grounds-this process also is not economic. Although the dibromoanthanthrone pigments are produced in a finely divided state in all the known processes mentioned, they form small, needleshaped crystals or pass over into the needle form when treated with organic solvents, either when finished or when dispersed in lacquer. Their existence in the needle form or tendency to crystallize in the needle form can be regarded as the cause of the poor rheological behavior. There was, therefore, a need to bring 4,10-dibromoanthanthrone and the other anthanthrones of the general formula mentioned below into a finely divided form of a type which is not itself needle-shaped and does not form needles in contact with organic solvents either.

It is now been found that anthanthrones of the general formula

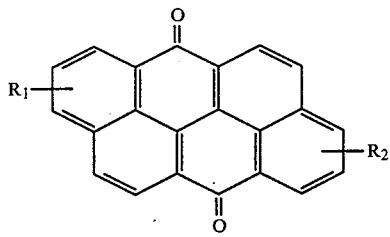

in which $R_1$ and $R_2$ denote chlorine, bromine or iodine atoms or $C_1$-$C_4$-alkoxy groups, having valuable properties, can be prepared by an economical route by first converting the anthanthrones of the general formula mentioned, in the form of the crude pigment, in an aqueous alkaline medium and at a pH>10, into the leuco-form, precipitating the latter by adding inorganic or organic acids, reoxidizing the aqueous suspension of the leuco-form to give the anthanthrones and subjecting the resulting finely divided pre-pigments of the formula mentioned to a solvent finish.

In the course of one embodiment of this process the procedure is as follows: the crude pigment is introduced at 0°-80° C., preferably 15°-30° C., into an 8-fold to 50-fold, preferalby 10-fold to 30-fold, amount of water, and the amount of concentrated sodium hydroxide solution and sodium dithionite required for vatting is added until a pH of 11.5 is finally reached. Stirring is then continued for 1 to 6 hours, preferably 1 to 3 hours. When vatting is complete, the insoluble, reduced form of the appropriate anthanthrone is precipitated by adding organic or inorganic acids at pH 7-11.5 and this form is then converted into the finely divided pre-pigment, preferably at pH 7-11.5, by oxidation with oxidizing agents, such as, for example, hydrogen peroxide, air or alkaline hypochlorite solution. After filtration, the finely divided pre-pigment is subjected to a solvent finish. After the solvent treatment (finish), the pigment is isolated in a customary manner.

A preferred procedure consists in not carrying out an intermediate isolation after the reoxidation, but adding the solvent to the reoxidized anthanthrone produced and then carrying out the solvent treatment. Surface-active compounds can be added before vatting, before oxidation and before the solvent treatment or after the solvent treatment, in order to improve the coloristic properties.

Aqueous solutions of alkali metal hydroxides preferably sodium and potassium hydroxide solutions, are used to prepare the aqueous alkaline medium in which the anthanthrones are initially converted into the leuco-form. It is expedient to employ sodium dithionite as the actual reducing agent.

Suitable acids for precipitating the leuco-form are both inorganic and organic acids, such as, for example, phosphoric acid, sulfuric acid, hydrochloric acid, formic acid, acetic acid, propionic acid and trichloroacetic acid.

The following are examples of solvents suitable for finishing:

($C_1$-$C_4$)-Alkanols, such as methanol, ethanol, propanol, n-butanol or i-butanol, $C_1$-$C_3$-dialkyl ketones, such as, for example, dimethyl ketone, diethyl ketone or methyl ethyl ketone, glycol ethers, such as, for example, the monomethyl or monoethyl ether of glycol, aromatic hydrocarbons, such as, for example, toluene, xylenes, or ethylbenzene, aromatic chlorinated hydrocarbons, such as, for example, chlorobenzene, o-dichlorobenzene, 1,2,4-trichlorobenzene or bromobenzene, aromatic nitro compounds, such as, for example, nitrobenzene or nitrophenol, aliphatic carboxamides, such as, for example, formamide or dimethylformamide, cyclic carboxamides, such as, for example, N-methylpyrrolidone, $C_1$-$C_4$-alkyl $C_1$-$C_3$-carboxylates, such as, for example, butyl formate, ethyl acetate or propyl propionate, or $C_1$-$C_4$-alkyl benzoates, such as, for example, ethyl benzoate.

By choosing the solvent, the pH value, the temperature, the time and the surface-active compound in the finishing process, it is possible to control the transparency and opacity of the pigments within wide limits. The process according to the invention is of particular importance for 4,10-dibromoanthanthrone, but is also applicable to the other compounds of the anthanthrone series of the general formula mentioned. The pigments obtained by the process according to the invention are distinguished by a high tinctorial strength, a pure color shade, high gloss in coats of paint, low viscosity in paints, satisfactory flocculation and dispersion behavior and very good fastness to weathering, in particular very good gloss retention when subjected to weathering.

EXAMPLE 1

1,000 ml of water are initially taken and 60 g of sodium dithionite and 1 g of a commercially available dispersing agent based on an alkylphenol polyglycol ether-sulfate are added. 40 g of 4,10-dibromoanthanthrone in the form of the crude pigment are then introduced at 20°–25° C. into the solution thus obtained, and 80 g of 33% strength sodium hydroxide solution are then added dropwise, whereupon a pH of 12.7 is set up. Stirring is then continued for a further hour at 20°–25° C. and 24.3 g of glacial acetic acid are then added dropwise in the course of 15 minutes until the pH is adjusted to a value of 10–11. Stirring is then continued for a further hour at 20°–25° C and 120 g of 35% strength perhydrol and 32 g of 33% strength sodium hydroxide solution are then added dropwise simultaneously at pH 10–11. When the addition is complete, stirring is continued for a further 15 hours at 20°–25° C. and the product is filtered off with suction and washed until it is neutral.

The press cake thus obtained is stirred with a solution composed of 183 ml of water and 6 g of 33% strength sodium hydroxide solution. After 40 g of nitrobenzene have been added, the mixture is heated at the boil for 3 hours, the nitrobenzene is then removed by steam distillation and the pigment is filtered off with suction, washed until neutral and dried at 80° C. This gives 39.2 g of pigment (4,10-dibromoanthanthrone) which is excellently suitable for coloring paints and plastic compositions.

EXAMPLE 2

1,000 ml of water are initially taken and 60 g of sodium dithionite are added. 40 g of 4,10-dibromoanthanthrone in the form of the crude pigment are introduced into the solution thus obtained, and 80 g of 33% strength sodium hydroxide solution are then added dropwise at 20°–25° C., whereupon a pH of 12.8 is set up. Stirring is then continued for 1 hour at 20°–25° C. and 20.8 g of 89% strength phosphoric acid are then added dropwise in the course of 15 minutes until the pH is adjusted to a value of 10–11. Stirring is then continued for 1 hour at 20°–25° C. and 90 g of 35% strength perhydrol and 45.4 g of 33% strength sodium hydroxide solution are then added dropwise simultaneously at pH 10–11. When the addition to complete stirring is continued for a further 15 hours at 20°–25° C., and the precipitate is then filtered off with suction and washed until neutral.

The moist press cake is stirred with a solution composed of 215 ml of water and 8.6 g of 33% strength sodium hydroxide solution, 40 g of nitrobenzene are added and the mixture is heated at the boil for 3 hours. The nitrobenzene is then removed by steam distillation and the pigment is washed until neutral and dried at 80° C. This gives 38.9 g of pigment (4,10-dibromoanthanthrone) which is excellently suitable for coloring paints and plastic compositions.

EXAMPLE 3

1,000 ml of water are intially taken and 60 g of sodium dithionite and 1 g of a commercially available dispersing agent based on an alkylphenol polyglycol ether-sulfate are added. 40 g of 4,10-dibromoanthanthrone in the form of the crude pigment are then introduced into the solution thus obtained, and 80 g of 33% strength sodium hydroxide solution are then added dropwise at 20°–25° C., whereupon a pH of 12.4 is set up. Stirring is then continued for 1 hour at 20°–25° C and 21.6 g of 89% strength phosphoric acid are then added dropwise in the course of 15 minutes until the pH is adjusted to a value of 10–11. Stirring is then continued for 1 hour at 20°–25° C., air is then passed in for 15 hours and at the same time 42.5 g of 33% strength sodium hydroxide solution are added dropwise at pH 10–11. The precipitate is then filtered off with suction and washed until neutral.

The resulting moist press cake is then stirred with a solution composed of 195 ml of water and 5.6 g of 33% strength sodium hydroxide solution. After 40 g of nitrobenzene have been added, the mixture is heated at the boil for 3 hours and the nitrobenzene is then removed by steam distillation and the pigment is filtered off with suction, washed until neutral and dried at 80° C. This gives 39.3 g of pigment (4,10-dibromoanthanthrone) which is excellently suitable for coloring paints and plastic compositions.

EXAMPLE 4

1,000 ml of water are initially taken and 60 g of sodium dithionite and 1 g of a commercially available dispersing agent based on an alkylphenol polyglycol ether-sulfate are added. 40 g of 4,10-dibromoanthanthrone in the form of the crude pigment are introduced into the solution thus obtained and 80 g of 33% strength sodium hydroxide solution are then added dropwise at 20°–25° C. until a pH of 12.9 is set up. Stirring is then continued for 1 hour at 20°–25° C. and 23.3 g of glacial acetic acid are then added dropwise in the course of 15 minutes until the pH is adjusted to a value of 10–11. Stirring is then continued for 1 hour at 20°–25° C. and 120 g of 35% strength perhydrol and 32 g of 33% strength sodium hydroxide solution are then added dropwise simultaneously at pH 10–11. When the addition is complete, stirring is continued for 15 hours at 20°–25° C., and the precipitate is filtered off with suction and washed until neutral.

The press cake is stirrred with 200 g of 85% strength isobutanol and the mixture is heated at the boil for 3 hours. After 200 ml of water have been added, the isobutanol is removed by distillation up to a head temperature of 100° C., and the precipitate is filtered off with suction, washed with water and dried at 80° C. This gives 39.6 g of pigment (4,10-dibromoanthanthrone) which is more transparent and has a higher tinctorial strength than the pigment obtained in Example 1 and which is excellently suitable for coloring paints and plastic compositions.

EXAMPLE 5

500 ml of water are initially taken and 30 g of sodium dithionite and 1 g of a commercially available dispersing agent based on an alkylphenol polyglycol ether-sulfate are added. 20 g of 4,10-dichloroanthanthrone in the form of the crude pigment are introduced into the solution thus obtained, and 40 g of 33% strength sodium hydroxide solution are added dropwise at 20°-25° C. until a pH of 12.3 is set up. Stirring is then continued for 2 hours at 20°-25° C. and 18.6 g of glacial acetic acid are added dropwise in the course of 15 minutes until the pH is adjusted to a value of 10-11. Stirring is then continued for 1 hour at 20°-25° C. and 60 g of 35% strength perhydrol and 16 g of 33% strength sodium hydroxide solution are added dropwise simultaneously at pH 10-11. When the addition is complete, stirring is continued for a further 15 hours at 20°-25° C. and the precipitate is filtered off with suction and washed until neutral.

The press cake is stirred with a solution composed of 137.6 ml of water and 6 g of 33% strength sodium hydroxide solution, 40 g of nitrobenzene are added and the mixture is heated at the boil for 3 hours. The nitrobenzene is then removed by steam distillation and the precipitate is filtered off with suction, washed until neutral and dried at 80° C. This gives 19.8 g of pigment (4,10-dichloroanthanthrone) which is excellently suitable for coloring paints and plastic compositions.

EXAMPLE 6

500 ml of water are initially taken and 30 g of sodium dithionite and 1 g of a commercially available dispersing agent based on an alkylphenol polyglycol ether-sulfate are added. 40 g of 4,10-dibromoanthanthrone in the form of the crude pigment are then introduced into the solution thus obtained, and 80 g of 33% stength sodium hydroxide solution are then added dropwise at 20°-25° C., and 20 g of sodium dithionite are then also added, until a pH of 12.3 is set up. Stirring is then continued for a further 3 hours at 20°-25° C., 19.4 g of 89% strength phosphoric acid are added dropwise until the pH is adjusted to a value of 10-11 and stirring is continued at 20°-25° C. 31.5 g of 35% strength perhydrol are then added dropwise, stirring is continued for a further 15 hours at 20°-25° C. and 5 g of 89% strength phosphoric acid are added dropwise until the pH is adjusted to a value of 9. 40 g of nitrobenzene are then added, the mixture is heated at the boil for 3 hours and the nitrobenzene is then removed by steam distillation and the precipitate is filtered off with suction, washed until neutral and dried at 80° C. This gives 39.4 g of pigment (4,10-dibromoanthanthrone) which is escellently suitable for coloring paints and plastic compositions.

EXAMPLE 7

560 ml of water are initially taken and 33.75 g of sodium dithionite and 0.6 g of a commercially available dispersing agent based on an alkylphenol polyglycol ether-sulfate are added. 22.5 g of 4,10-diiodoanthanthrone in the form of the crude pigment are then introduced into the solution thus obtained, and 45 g of 33% strength sodium hydroxide solution are added dropwise at 20°-25° C., whereupon a pH of 12.7 is set up. Stirring is then continued for a further 3 hours at 20°-25° C. and 14.5 g of glacial acetic acid are then added dropwise in the course of 15 minutes until the pH is adjusted to a value of 10-11. Stirring is then continued for a further hour at 20°-25° C. and 50.6 g of 35% strength perhydrol and 27.2 g of 33% strength sodium hydroxide solution are added dropwise simultaneously at pH 10-11. When the addition is complete, stirring is continued for a further 15 hours at 20°-25° C. and the precipitate is filtered off with suction and washed until neutral.

The press cake is then stirred with a solution composed of 105.2 ml of water and 1.6 g of anhydrous sodium carbonate, 22.5 g of nitrobenzene are added and the mixture is heated at the boil for 3 hours. Finally, the nitrobenzene is removed by steam distillation and the precipitate is filtered off with suction, washed until neutral and dried at 80° C. This gives 21.6 g of pigment (4,10-diiodoanthanthrone) which is excellently suitable for coloring paints and plastic compositions.

EXAMPLE 8

345 ml of water are initially taken and 20.7 g of sodium dithionite and 0.4 g of a commercially available dispersing agent based on an alkylphenol polyglycol ethersulfate are added. 13.8 g of 4,10-diethoxyanthanthrone in the form of the crude pigment are introduced into the solution thus obtained, and 27.6 g of 33% strength sodium hydroxide solution are added dropwise at 20°-25° C., whereupon a pH of 12.7 is set up. Stirring is then continued for a further 3 hours at 20°-25° C. and 8.0 g of glacial acetic acid are then added dropwise in the course of 15 minutes until the pH is adjusted to a value of 10-11. Stirring is then continued for 1 hour at 20°-25° C., 31.0 g of 35% strength perhydrol and 11.9 g of 33% stength sodium hydroxide solution are added dropwise simultaneously at pH 10-11 and stirring is continued for a further 15 hours at 20°-25° C. The precipitate is then filtered off with suction and washed until neutral.

The press cake is stirred with a solution composed of 105.5 ml of water and 1.4 g of anhydrous sodium carbonate, 13.8 g of nitrobenzene are added and the mixture is heated at the boil for 3 hours. Finally, the nitrobenzene is removed by steam distillation and the precipitate is filtered off with suction, washed until neutral and dried at 80° C. This gives 13.6 g of pigment (4,10-diethoxyanthanthrone) which is excellently suitable for coloring paints and plastic compositions.

We claim:

1. A process for the preparation of a pigment of the anthanthrone series having the formula

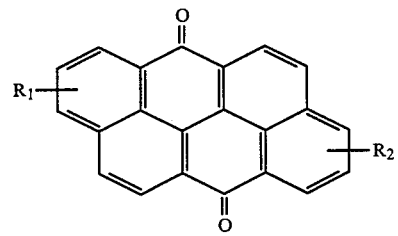

in which $R_1$ and $R_2$ denote chlorine, bromine or iodine atoms or $C_1$–$C_4$-alkoxy groups, which comprises:
  a. reducing with sodium dithionite a crude anthanthrone of the said formula to the leuco form in an alkaline medium at a pH>10,
  b. adding an inorganic or organic acid, to pH 7 to 11.5, to precipitate the leuco anthanthrone,
  c. oxidizing the resulting aqueous suspension of leuco anthanthrone at a pH of 7 to 11.5 to give finely-divided anthanthrone pre-pigment, and
  d. treating the resulting finely divided anthanthrone pre-pigment with solvent.

2. The process as claimed in claim 1, wherein the inorganic or organic acid addition is carried out with hydrochloric acid, sulfuric acid, phosphoric acid, formic acid, acetic acid, propionic acid or trichloracetic acid, and the oxidizing is carried out with hydrogen peroxide, hydrogen peroxide adducts, air, alkaline hypochlorite solution or sodium m-nitrobenzene sulfonate.

3. The process as claimed in claim 1, wherein the solvent for said step (d) is added directly to the anthanthrone pre-pigment resulting from said step (c).

4. The process as claimed in claim 1, wherein the solvent used for the solvent finish step is a $C_1$–$C_4$-alkanol, a $C_1$–$C_3$-dialkyl ketone, a glycol ether, an aromatic hydrocarbon, an aromatic chlorinated hydrocarbon, an aromatic nitro compound, an aliphatic or cyclic carboxamide, a $C_1$–$C_4$-alkyl $C_1$–$C_3$-carboxylate or a $C_1$–$C_4$ alkyl benzoate.

5. The process as claimed in claim 2, wherein the adding of a said acid does not decrease the pH of the alkaline medium below about 10.

* * * * *